United States Patent
Arrivet

(10) Patent No.: US 11,392,735 B2
(45) Date of Patent: Jul. 19, 2022

(54) METHOD FOR TRANSPOSING A SURFACE PRESSURE FIELD FROM A MESH MODELING A TURBOMACHINE PART TO ANOTHER MESH

(71) Applicant: SAFRAN AIRCRAFT ENGINES, Paris (FR)

(72) Inventor: Sébastien Marie Arrivet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 173 days.

(21) Appl. No.: 17/018,378

(22) Filed: Sep. 11, 2020

(65) Prior Publication Data

US 2021/0117590 A1 Apr. 22, 2021

(30) Foreign Application Priority Data

Sep. 12, 2019 (FR) ...................................... 1910097

(51) Int. Cl.
*G06F 30/20* (2020.01)
*G06F 30/23* (2020.01)
*G06F 111/10* (2020.01)

(52) U.S. Cl.
CPC .............. *G06F 30/20* (2020.01); *G06F 30/23* (2020.01); *G06F 2111/10* (2020.01)

(58) Field of Classification Search
CPC ....... G06F 30/20; G06F 30/23; G06F 2111/10
See application file for complete search history.

(56) References Cited

U.S. PATENT DOCUMENTS

2012/0316842 A1* 12/2012 Lapworth ............... G06F 30/23
703/1

OTHER PUBLICATIONS

Gagliardi F, Tsiakas KT, Giannakoglou K. A two-step mesh adaptation tool based on RBF with application to turbomachinery optimization loops. InEvolutionary and Deterministic Methods for Design Optimization and Control With Applications to Industrial and Societal Problems (pp. 127-141). Springer, Cham (Year: 2019).*

(Continued)

*Primary Examiner* — Chuen-Meei Gan
(74) *Attorney, Agent, or Firm* — Sughrue Mion, PLLC

(57) ABSTRACT

A computer-implemented method includes calculating first pseudo-pressure values at vertices or edges of a first mesh modeling a turbomachine part, the calculation being based on input pressure values of a surface pressure field that are respectively associated with free faces of the first mesh, transposing the first pseudo-pressure values from the first mesh to a second mesh different from the first mesh by an interpolation tool to generate second pseudo-pressure values, and calculating output pressure values associated with free faces of the second mesh based on the second pseudo-pressure values. The first and second meshes each define free faces representative of free surface portions of the part, and internal faces representative of zones crossing the part, and all the first pseudo-pressure values are associated with only free faces of the first mesh or all the output pressure values are associated with only free faces of the second mesh.

10 Claims, 2 Drawing Sheets

(56) References Cited

OTHER PUBLICATIONS

Khoei et al., "Numerical simulation of ductile crack growth under cyclic and dynamic loading with a damage-viscoplasticity model", Engineering Fracture Mechanics, vol. 99, pp. 169-190, 2013, XP028998350 (22 pages total).

Mediavilla et al., "A robust and consistent remeshing-transfer operator for ductile fracture simulations", Computers and Structures, vol. 84, pp. 604-623, 2006, XP027991582 (20 pages total).

Martins et al., "A new staggered algorithm for thermiomechanical coupled problems", International Journal of Solids and Structures, vol. 122, pp. 42-58, 2017, XP085123519 (17 pages total).

French Search Report dated Jun. 4, 2020 from the French Intellectual Property Office in FR Application No. 1910097.

\* cited by examiner

[Fig. 1]
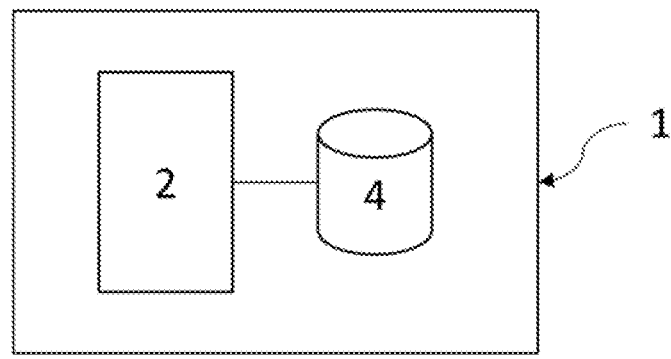
[Fig. 2]
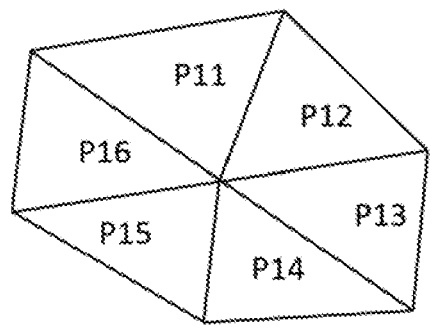
[Fig. 3]
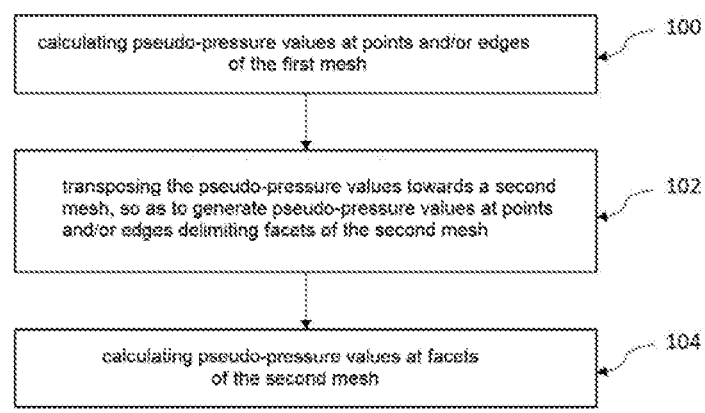

[Fig. 4]
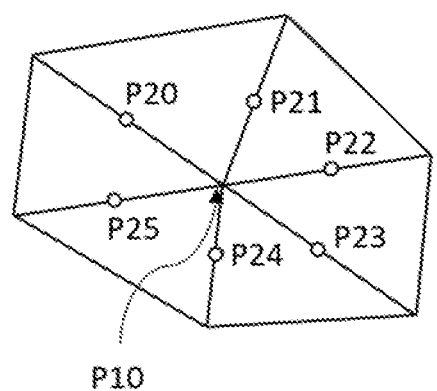
[Fig. 5]
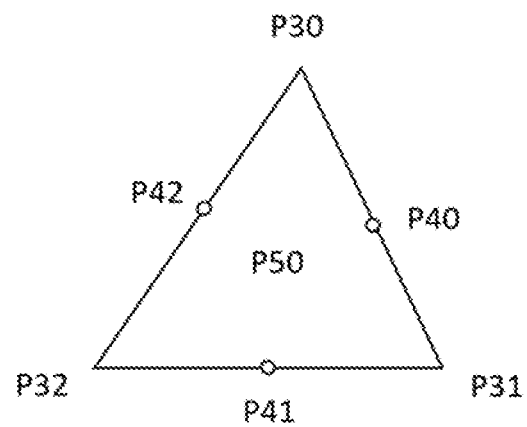

METHOD FOR TRANSPOSING A SURFACE PRESSURE FIELD FROM A MESH MODELING A TURBOMACHINE PART TO ANOTHER MESH

FIELD OF THE INVENTION

The present invention relates to the field of computer modeling of mechanical parts. It advantageously finds application for modeling turbomachine parts.

STATE OF THE ART

In order to define the shape of a turbomachine part, the pressure that such a part may undergo during the operation of the turbomachine is usually taken into account.

For that purpose, the part is modeled in the form of a mesh comprising vertices and edges defining faces. Among these faces, some faces, called free faces, are representative of free surface portions of the part.

A surface pressure field is also developed. The surface pressure field comprises a plurality of pressure values, each pressure value being associated with one of the free faces of the mesh.

Achieving this association of a pressure value with each free face of the mesh requires a lot of time and know-how. Indeed, to achieve such an association, it is necessary to model a flow acting on the part, which is complex. It is also necessary to carry out a zoning work, consisting in segmenting the mesh into different portions, which is tedious and long. Generally, obtaining a surface pressure field is thus entrusted to specialized experts.

These surface pressure fields can then be used by other teams of people who exploit such surface pressure fields for finite element modeling, whose purpose is to determine the mechanical behavior of the part, but who are not such specialized experts.

However, in some situations, a non-specialized person may realize that the mesh for which he has a surface pressure field is not optimal, and must therefore be modified. For example, a zone of the considered part can comprise an insufficient number of faces, in which case this person must add such faces in the mesh.

However, the surface pressure field is no longer adapted to the modified mesh. And requesting an expert to regenerate a new surface pressure field adapted to the modified mesh is obviously long and therefore very expensive.

DISCLOSURE OF THE INVENTION

An aim of the invention is to be able to transpose a surface pressure field from a first mesh modeling a turbomachine part to a second mesh modeling the same part but being different from the first mesh, in a way that is fast and inexpensive.

To this end, there is proposed, according to a first aspect, a method for transposing a surface pressure field from a first mesh modeling a turbomachine part to a second mesh different from the first mesh, in which the surface pressure field comprises pressure values respectively associated with faces of the first mesh, the method comprising the following steps implemented by computer:

a) calculating pseudo-pressure values at vertices and/or edges of the first mesh, each pseudo-pressure value at a vertex or an edge being calculated based on pressure values of the surface pressure field respectively associated with faces of the first mesh delimited by the vertex or the edge, b) transposing the pseudo-pressure values calculated in step a) from the first mesh to the second mesh by a thermal field interpolation tool, so as to generate pseudo-pressure values at vertices and/or edges of the second mesh, c) for at least one face of the second mesh, calculating a pressure value associated with the face based on the pseudo-pressure values generated in step b) at vertices and/or edges delimiting the face of the second mesh.

The first mesh and the second mesh each define:
free faces representative of free surface portions of the part and
internal faces representative of zones crossing the part,
in which step a) is implemented to calculate pseudo-pressure values at vertices and/or edges selectively associated with free faces of the first mesh but not with internal faces of the first mesh, and/or in which step c) is implemented selectively on free faces of the second mesh and not on internal faces of the second mesh.

Thanks to these selective calculations, the duration of implementation of the transposition method is much shorter than the one required to regenerate a complete mesh in the way described in the introduction.

The method according to the first aspect can optionally comprise the following characteristics, taken alone or combined together when this is technically possible.

The method according to the first aspect can cleverly take advantage of the fact that a thermal field interpolation tool is already known, making it possible to transpose thermal fields from one mesh to the other. The method makes it possible to divert this tool from its primary use, by injecting it not with temperatures but with pressures. However, a surface pressure field defines pressures at mesh faces, while this tool takes as input temperatures at mesh vertices or edges, hence the implementation of steps a) and c).

Preferably, a pseudo-pressure value calculated in step a) at a vertex or at an edge is an average of pressure values of the surface pressure field respectively associated with faces of the first mesh delimited by the vertex or the edge.

Preferably, the method comprises a heat transfer calculation taking the pseudo-pressure values calculated in step a) as initial conditions, so as to obtain temperature values at vertices and/or edges of the first mesh, the temperature values being passed as input to the interpolation tool.

Preferably, a pressure value associated with a face of the second mesh and calculated in step c) is an average of pseudo-pressure values generated in step b).

Preferably the first mesh and the second mesh each define:
free faces representative of free surface portions of the part, and
internal faces representative of zones crossing the part,
and step a) is selectively implemented to calculate pseudo-pressure values at vertices and/or edges of free faces of the first mesh, and/or in which step c) is selectively implemented on free faces of the second mesh.

Preferably, at least one of the first mesh and of the second mesh is a tetrahedral mesh.

Preferably, at least one of the first mesh is of degree 2.

Preferably, the part is a portion of a high-pressure turbine of the turbomachine, for example a blading.

Also proposed are: a computer program product comprising program code instructions for executing the steps of the method according to the first aspect, when this program is executed by a computer, as well as a computer-readable memory storing instructions executable by the computer for executing the steps of this method.

DESCRIPTION OF THE FIGURES

Other features, aims and advantages of the invention will emerge from the following description which is purely illustrative and not limiting and which should be read in relation to the appended drawings in which:

FIG. 1 schematically illustrates a device for transposing a surface pressure field from one mesh to another, according to one embodiment of the invention.

FIG. 2 represents part of a first mesh and pressure values associated with faces of this first mesh.

FIG. 3 is a flowchart of steps of a method for transposing a surface pressure field from one mesh to another, according to one embodiment of the invention.

FIG. 4 represents the same mesh part as the one represented in FIG. 2 as well as pseudo-pressure values calculated in different elements of this mesh.

FIG. 5 represents part of a second mesh, and pressure or pseudo-pressure values associated with different elements of this second mesh.

In all of the figures, similar elements bear identical references.

DETAILED DESCRIPTION OF THE INVENTION

Referring to FIG. 1, a device 1 for transposing a surface pressure field comprises at least one processor 2 and one memory 4.

The device 1 is for example a computer to be used for finite element modeling. It can therefore comprise a screen and an input interface (mouse, keyboard, touch sensitive element, etc.).

There is stored in the memory 4 a transposition program comprising code instructions for executing a method which will be described below.

In other words, memory 4 is a non-transitory computer-readable medium comprising code instructions of the transposition program.

The transposition program comprises an interpolation tool or is configured to interact with such a tool.

In the following, the non-limiting example of an interpolation tool suitable for interpolating a thermal field is considered.

The processor 2 is configured to execute this transposition program. The processor may be of any type: a CPU, a circuit such as an ASIC, a reprogrammable circuit such as an FPGA, etc.

Data representative of a first mesh are also stored in the memory 4, the first mesh being itself representative of a turbomachine part.

This part is typically a portion of a high-pressure turbine of a turbomachine.

The first mesh comprises of a plurality of vertices (also called nodes). Each vertex has a 3D position specific thereto.

Some pairs of vertices of the first mesh are linked by an edge.

The first mesh furthermore comprises cells connecting the vertices to each other.

The first mesh is a 3D mesh in the sense that these cells are polyhedra comprising a plurality of faces.

These polyhedra are for example tetrahedra (in this case, the faces are triangular).

Each face is definitively delimited by vertices and by edges of the first mesh. More specifically, each polygonal face is defined by and between at least three vertices (forming the vertices of the face) and at least three edges (forming the sides of the face).

The first mesh is also for example of order 2.

There are two types of faces in the first mesh: faces, known as "free" faces, representative of portions of surfaces of the considered part, and faces known as "internal" faces, crossing the part.

By way of example, FIG. 2 represents six free faces of the first mesh. A vertex of this first mesh constitutes a vertex of each of these faces, which are here triangular, or an edge in the case of a mesh of degree 2.

A surface pressure field associated with the first mesh is also stored in the memory. The surface pressure field comprises a plurality of pressure values. Each of these pressure values is associated with one of the free faces of the first mesh: it represents a pressure value that the part is able to undergo in a portion of surface modeled by the associated face.

The surface pressure field can also comprise zero pressure values which are associated with the internal faces of the first mesh. As a variant, the internal faces of the first mesh are not associated with pressure values of the surface pressure field.

As indicated in the introduction, the first mesh and the associated surface pressure field are developed jointly by an expert, according to a method known from the state of the art requiring a lot of time (up to 3 weeks for a part of very complex shape).

The pressure values of the surface pressure field which are associated respectively with the faces represented in FIG. 2 are referenced $P11$ to $P16$.

Data representative of a second mesh are also stored in the memory 4, this second mesh itself being representative of the same part as the first mesh, or of a slightly different turbomachine part. The second mesh is different from the first mesh. This implies that the second mesh comprises more vertices than the first mesh or fewer vertices than the first mesh or that vertices of the second mesh have positions different from those of the first mesh.

The second mesh has for example been generated by a program based on the first mesh, by deleting or moving at least one vertex of the first mesh or by adding at least one new vertex in the first mesh. Such a modification can in particular be carried out using the ANSA program.

With reference to FIG. 3, the following steps are implemented by the transposition program, when this program is executed by the processor 2 of the device 1, to obtain a new surface pressure field adapted to the second mesh.

During a step 100, the processor 2 calculates pseudo-pressure values at vertices and/or edges of the first mesh, each pseudo-pressure value at a vertex or an edge being calculated based on pressure values of the surface pressure field respectively associated with faces of the first mesh delimited by the vertex or the edge.

FIG. 4 represents the following data calculated during step 100: a pseudo-pressure P10 calculated at the vertex linking the six faces represented in FIG. 2, as well as pseudo-pressures P21-P25 calculated at the edges linking these six faces two by two.

To obtain a pressure value at a vertex of the mesh, the average of pressure values of the surface pressure field respectively associated with faces of the first mesh having the considered vertex as a vertex is for example calculated. Preferably, all the faces of the first mesh having the vertex considered as vertex are taken into account.

Thus we have: $P10=(P11+P12+P13+P14+P15+P16)/6$.

To obtain a pressure value at an edge of the mesh, the average of pressure values of the surface pressure field respectively associated with faces of the first mesh having the edge as a side is calculated.

Thus we have:

$$P20=(P16+P11)/2$$

$$P21=(P11+P12)/2$$

$$P22=(P12+P13)/2$$

$$P23=(P13+P14)/2$$

$$P24=(P14+P15)/2$$

$$P25=(P15+P16)/2$$

In the embodiment illustrated in FIGS. 2 and 4, the pseudo-pressure values are thus calculated in the form of arithmetic means, but other types of calculations can be considered (other types of means, linear combination, etc.).

Step 100 is implemented for different vertices or edges delimited by free surfaces of the first mesh.

The processor then implements a heat transfer calculation taking the pseudo-pressure values calculated in step 100 as initial conditions, so as to obtain temperature values at vertices and/or edges of the first mesh.

The temperature values are then passed as input to the thermal field interpolation tool, along with the first mesh and the second mesh.

During a transposition step 102, the interpolation tool generates, by interpolation of these input data, pseudo-pressure values associated with vertices and/or edges of the second mesh. At least one face whose vertices and/or sides are associated with pseudo-pressure values are thus found in the second mesh.

This generation is implemented for all the free faces of the second mesh, even for all the faces of the second mesh.

A face of the second mesh is represented by way of example in FIG. 5. This triangular face comprises three vertices corresponding to three vertices of the second mesh, and three sides corresponding to three edges of the mesh. During the transposition step 102, were generated by the thermal field interpolation tool: pseudo-pressure values P30 to P32 at these vertices and pseudo-pressure values P40 to P42 at these edges.

In a step 104, the processor 2 uses these pseudo-pressure values to obtain a new surface pressure field associated with the second mesh. For that purpose, the processor 2 calculates for at least one face of the second mesh, a pressure value associated with the face, based on pseudo-pressure values generated by the interpolation tool at vertices and/or edges of the second mesh that delimit this face.

For example, a pressure value P50 calculated for the face represented in FIG. 5 depends on the pseudo-pressure values P30 to P32 at the three vertices of this face and on the pseudo-pressure values P40 to P42 calculated at the three sides of this face.

Preferably, the calculation carried out is an average of all or part of these pseudo-pressure values. Therefore, we have for example, in the case of an arithmetic mean:

$$P50=(P30+P31+P32+P40+P41+P42)/6$$

This step 104 is conducted on several free faces of the second mesh, or even all of them. Preferably, this step is selectively implemented on free faces of the second mesh.

The duration of implementation of the steps of the aforementioned method is much shorter than the one required to regenerate a complete mesh in the way described in the introduction (less than 30 minutes versus several weeks).

The method described above can also be the subject of other variants. In particular, only pseudo-pressures at face vertices can be calculated during step 100 and/or 104. As a variant, only pseudo-pressures at face edges can be calculated during step 100 and/or 104. But calculating pseudo-pressures at vertices and faces, as illustrated in FIGS. 4 and 5, allows transposing in a finer and more precise manner a surface pressure field from the first mesh to the second mesh.

The invention claimed is:

1. A computer-implemented method comprising:
    calculating first pseudo-pressure values at vertices and/or edges of a first mesh modeling a turbomachine part, each of the first pseudo-pressure values being calculated based on input pressure values of a surface pressure field, and the input pressure values being respectively associated with free faces of the first mesh,
    transposing the first pseudo-pressure values from the first mesh to a second mesh different from the first mesh by an interpolation tool, so as to generate second pseudo-pressure values at vertices and/or edges of the second mesh, and
    calculating output pressure values associated with free faces of the second mesh based on the second pseudo-pressure values,
    wherein the first mesh and the second mesh each define free faces representative of free surface portions of the turbomachine part, and internal faces representative of zones crossing the turbomachine part,
    and wherein all the first pseudo-pressure values are associated with only free faces of the first mesh and/or all the output pressure values are associated with only free faces of the second mesh to reduce computational cost without regenerating a new complete mesh.

2. The method of claim 1, wherein at least one of the first pseudo-pressure values is an average of input pressure values of the surface pressure field.

3. The method of claim 1, wherein the interpolation tool is configured to also interpolate a thermal field.

4. The method of claim 1, comprising calculating a heat transfer taking the first pseudo-pressure values as initial conditions, so as to obtain temperature values at vertices and/or edges of the first mesh, the temperature values being inputted in the interpolation tool.

5. The method of claim 1, wherein at least one of the output pressure values is an average of the second pseudo-pressure values.

6. The method of claim 1, wherein at least one of the first mesh and the second mesh is a tetrahedral mesh.

7. The method of claim 1, wherein at least one of the first mesh and the second mesh is of degree 2.

8. The method of claim 1, wherein the turbomachine part is a portion of a high-pressure turbine of a turbomachine.

9. The method of claim 1, wherein the turbomachine part is a portion of a blade of a high-pressure turbine.

10. A non-transitory computer-readable medium storing code which, when accessed and executed by a computer, causes the computer to perform the method of claim 1.

* * * * *